US010289216B2

(12) United States Patent
Danglard et al.

(10) Patent No.: US 10,289,216 B2
(45) Date of Patent: May 14, 2019

(54) DEVICE FOR ADJUSTING THE BRAKING FORCE OF A ROLLING BALL OR "TRACKBALL" AND ASSOCIATED ROLLING BALL

(71) Applicant: THALES, Courbevoie (FR)

(72) Inventors: Stéphane Danglard, Merignac (FR); Laurent Mozer, Merignac (FR); Erick Moreaud, Pessac (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 15/625,881

(22) Filed: Jun. 16, 2017

(65) Prior Publication Data

US 2017/0364168 A1 Dec. 21, 2017

(30) Foreign Application Priority Data

Jun. 21, 2016 (FR) ...................................... 16 00983

(51) Int. Cl.
*G06F 3/0354* (2013.01)
*F16D 63/00* (2006.01)

(52) U.S. Cl.
CPC ......... *G06F 3/03549* (2013.01); *F16D 63/00* (2013.01)

(58) Field of Classification Search
USPC ....................................................... 345/167
See application file for complete search history.

(56) References Cited

U.S. PATENT DOCUMENTS

| 5,237,311 | A | * | 8/1993 | Mailey | G06F 3/03549 273/148 B |
| 5,280,276 | A | * | 1/1994 | Kwok | G06F 3/03541 345/163 |
| 5,543,821 | A | * | 8/1996 | Marchis | G06F 1/1632 345/157 |
| 9,836,140 | B2 | * | 12/2017 | Bigand | F16D 49/10 |
| 2002/0190985 | A1 | * | 12/2002 | Yokoji | G06F 3/0312 345/424 |
| 2004/0164963 | A1 | * | 8/2004 | Ono | G06F 3/016 345/167 |
| 2006/0290675 | A1 | * | 12/2006 | Bricaud | G06F 3/0312 345/167 |
| 2007/0083115 | A1 | * | 4/2007 | Lee | A61B 8/00 600/437 |
| 2010/0184514 | A1 | * | 7/2010 | Tsai | A63F 13/24 463/38 |

(Continued)

FOREIGN PATENT DOCUMENTS

EP    2 927 785 A1    10/2015

*Primary Examiner* — Chineyere D Wills-Burns
(74) *Attorney, Agent, or Firm* — Baker & Hostetler LLP

(57) ABSTRACT

A device for adjusting the braking force of a rolling ball or "trackball" comprises: a rotating ring in the form of a straight circular hollow cylinder, the ring comprising a flexible annular seal, the outer periphery of the cylinder comprising: an inclined oblong; a plurality of identical notches; a fixed support comprising: a circular void; a fixed pin and an indexing finger arranged so that, the ring being mounted in the void of the support, the fixed pin is housed in the oblong of the ring and the indexing finger in one of the notches of the ring, the rotation of the ring causing the displacement of the pin in the oblong, the indexed notch to change and a translational motion of the ring parallel to the axis of revolution of the cylinder.

7 Claims, 3 Drawing Sheets

(56) References Cited

U.S. PATENT DOCUMENTS

| | | | |
|---|---|---|---|
| 2011/0109555 A1* | 5/2011 | Miller | B60K 35/00 345/167 |
| 2012/0038495 A1* | 2/2012 | Ishikawa | G06F 3/016 341/20 |
| 2014/0002362 A1* | 1/2014 | Srivastava | G06F 3/03549 345/167 |

* cited by examiner

Cross section A - A

DEVICE FOR ADJUSTING THE BRAKING FORCE OF A ROLLING BALL OR "TRACKBALL" AND ASSOCIATED ROLLING BALL

CROSS-REFERENCE TO RELATED APPLICATIONS

This application claims priority to foreign French patent application No. FR 1600983, filed on Jun. 21, 2016, the disclosure of which is incorporated by reference in its entirety.

FIELD OF THE INVENTION

The general field of the invention is that of rolling balls, also known as "trackballs". These devices are used for controlling a graphical cursor on one or more display screens. It is thus possible to select and/or modify a display unit, a display window or a displayed parameter. The more particular field of the invention is that of the trackballs used in aircraft cockpits.

BACKGROUND

Modern aircraft cockpits comprise a display system comprising several display screens. The information displayed is controlled and modified by means of various human-machine interfaces. The trackball constitutes one of its interfaces. It mainly comprises a rolling ball whose upper part is accessible to the user. The lower part rests on motion sensors which can be of different types and which detect the rotations of the ball in two right-angled directions. The information from the sensors makes it possible to displace a graphical cursor on a display screen.

In an aeronautical application, the rolling ball is subjected, during certain flight phases, to vibrations or accelerations which can be high. Also, it cannot be allowed to rotate freely. It must be braked to prevent any spurious motion during these critical phases. This adjustment is difficult in as much as the ball has to be braked sufficiently so as not to be sensitive to the vibrations but the rotation must remain flexible enough for a user to be able to rotate the ball without significant force.

Currently, the adjustment of the brake is ensured by a setup represented in FIG. 1. A ring 2 comprising a flexible seal 3 is fixed to the body 4 of the device which comprises the rolling ball 1. This ring surrounds the upper part of the rolling ball. The braking force of the flexible seal is ensured by shims 5 arranged between the lower part of the ring 2 and the body 4. It is symbolized by the two inclined white arrows of FIG. 1. This solution has two drawbacks. It is complex to implement. Moreover, in operation, the braking forces gradually increase. This hardening is due to a clogging of the various mechanical elements such as the axes, the rings, the rolling bearings, associated with intensive use on an aeroplane. Ultimately, the rolling ball must be removed, dismantled and cleaned.

SUMMARY OF THE INVENTION

The device according to the invention does not have these drawbacks. In effect, it makes it possible to easily perform the adjustment without having to dismantle or change or clean mechanical parts. More specifically, the subject of the invention is a device for adjusting the braking force of a rolling ball or "trackball", characterized in that it comprises:

a rotating ring in the form of a straight circular hollow cylinder, said ring comprising a flexible annular braking seal, the outer periphery of the cylinder comprising:
  a first oblong inclined by an angle of a few degrees in relation to the base of the cylinder;
  a first plurality of identical notches at right angles to said base of the cylinder, the inner diameter of the hollow cylinder having a diameter greater than that of the rolling ball and the inner diameter of the annular seal being less than that of the rolling ball;
a fixed support comprising:
  a circular void with a diameter equal to that of the outer periphery of the cylinder;
  a fixed pin and an indexing finger arranged so that, the ring being mounted in the void of the fixed support, the fixed pin is housed in the oblong of the ring and the indexing finger in one of the notches of the ring, the rotation of the ring causing the displacement of the pin in the oblong, the indexed notch to change and a translational motion of the ring parallel to the axis of revolution of the cylinder.

Advantageously, the hollow cylinder of the ring comprises at least one second oblong identical to the first oblong and a second plurality of notches identical to the first plurality of notches.

Advantageously, the outer periphery of the cylinder comprises a maneuvering lever for maneuvering the ring.

Advantageously, the fixed support comprises markings making it possible to identify the position of the maneuvering lever.

Advantageously, the outer periphery of the cylinder comprises, at the entry of the oblong, a slit making it possible to fit the rotating ring in the support.

Advantageously, the support comprises means for blocking the slit so as to avoid any removal of the rotating ring mounted in its support.

Advantageously, said rolling ball device comprises a device for adjusting the braking force of said ball according to one of the preceding claims.

BRIEF DESCRIPTION OF THE DRAWINGS

The invention will be better understood and other advantages will become apparent on reading the following description, given in a nonlimiting manner and using the attached figures in which.

DETAILED DESCRIPTION

Figure 1:
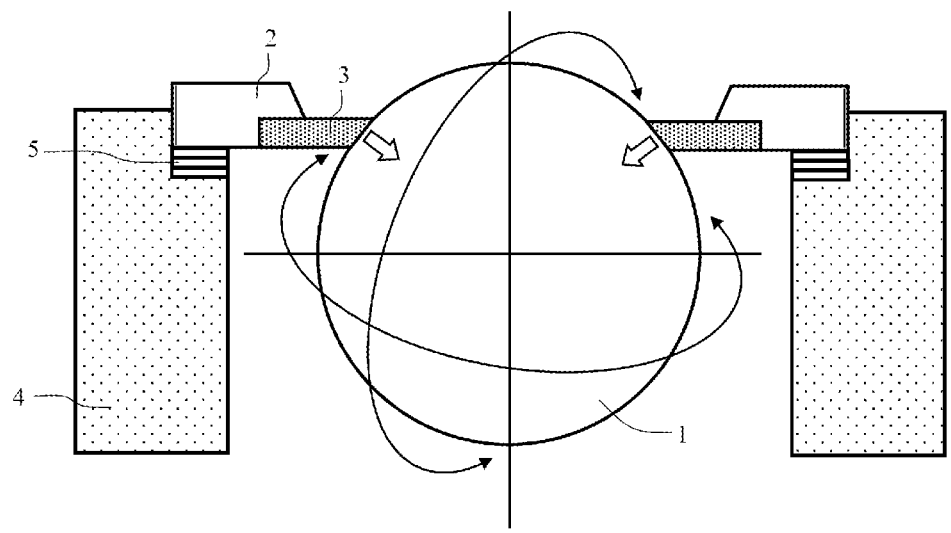
FIG. 1 represents the mounting of a rolling ball according to the prior art.
Figure 2:
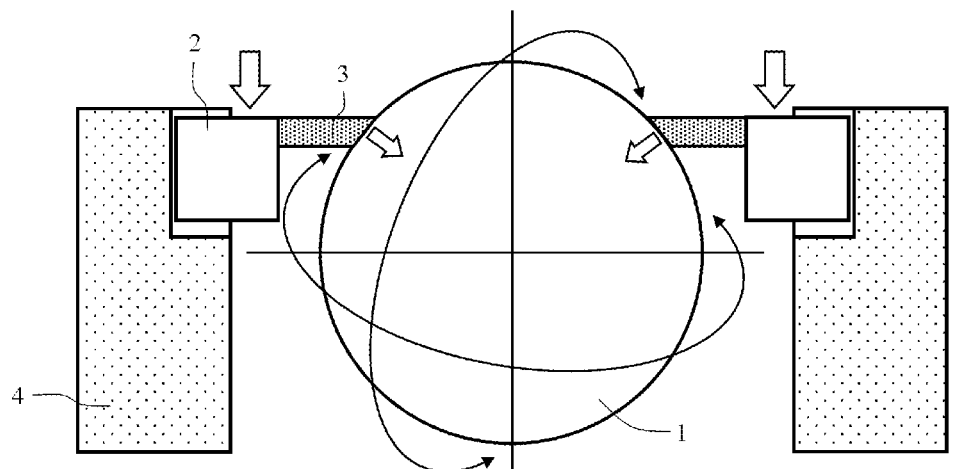
FIG. 2 represents the technical principle of the device for adjusting the braking force of a rolling ball according to the invention.

FIG. 2 represents the technical principle of the device for adjusting the braking force of a rolling ball according to the invention. To obtain the force desired on the rolling ball, the ring 2 comprising the flexible seal 3 is no longer fixed to the support but can be mechanically adjusted heightwise as indicated by the twin white arrows of FIG. 2. Thus, when the user lifts the ring in its support, the pressure exerted by the seal on the ball decreases and this pressure increases otherwise. This arrangement offers three main advantages. The first is a considerable reduction of the trackball adjustment and assembly time. The second advantage is the possibility of adjusting the adjustment force without dismantling by the end user. Finally, the trackball is ensured of a longer life in as much as, when the ball is clogged, the force required for rotation can be reduced by a simple displacement of the ring.

There are various mechanical means that make it possible to ensure the translation of the ring. However, this translation has a certain number of features. Its amplitude is small, of the order of a millimeter. It is therefore essential to ensure the adjustment with great accuracy. The position of the ring must also be retained when the user rotates the rolling ball. Finally, the adjustment must be made simply by the user.

The device for adjusting the braking force of a rolling ball according to the invention meets these various criteria. The ring comprises mechanical means making it possible to convert its rotation into a translational motion of small amplitude, the conversion being ensured by a fixed pin sliding in a mobile oblong.

Figure 3:
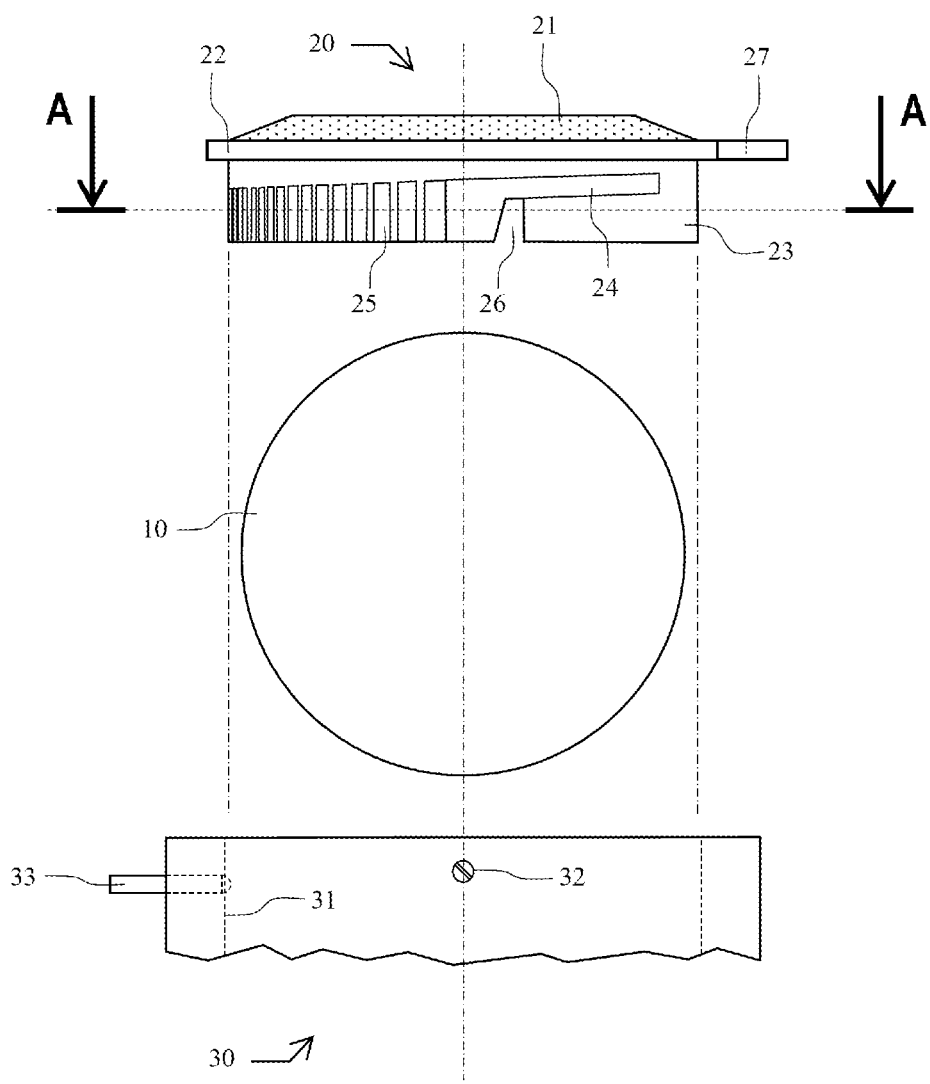
FIG. 3 represents an exploded front view of a device for adjusting the braking force of a rolling ball according to the invention.

This device is represented in the exploded front view of FIG. 3. The latter comprises a rotating ring 20, a rolling ball 10 and a support 30 represented in partial cross section.

The rotating ring 20 is in the form of a straight circular hollow cylinder. The ring 20 is topped by a flexible annular braking seal 21. It comprises a circular shoulder 22. This shoulder has a maneuvering lever 27. The outer periphery 23 of the cylinder comprises:

a first oblong 24 inclined by an angle of a few degrees in relation to the base of the cylinder. The smaller this angle is, the greater the rotation of the ring has to be to provoke its rotational movement;

a first plurality of identical notches 25 at right angles to said base of the cylinder.

The inner diameter of the hollow cylinder is of a diameter greater than that of the rolling ball and the inner diameter of the annular seal is less than that of the rolling ball. The outer periphery of the cylinder comprises, at the entry of the oblong 24, a slit or loophole 26 making it possible to fit the rotating ring in the support 30. This slit can comprise blocking means in order to avoid any accidental removal of the ring in its support.

The fixed support 30 comprises:

a circular void 31 with a diameter equal to that of the outer periphery of the cylinder;

a fixed pin 32 and an indexing finger 33;

markings making it possible to identify the position of the maneuvering lever 27.

Figure 4:
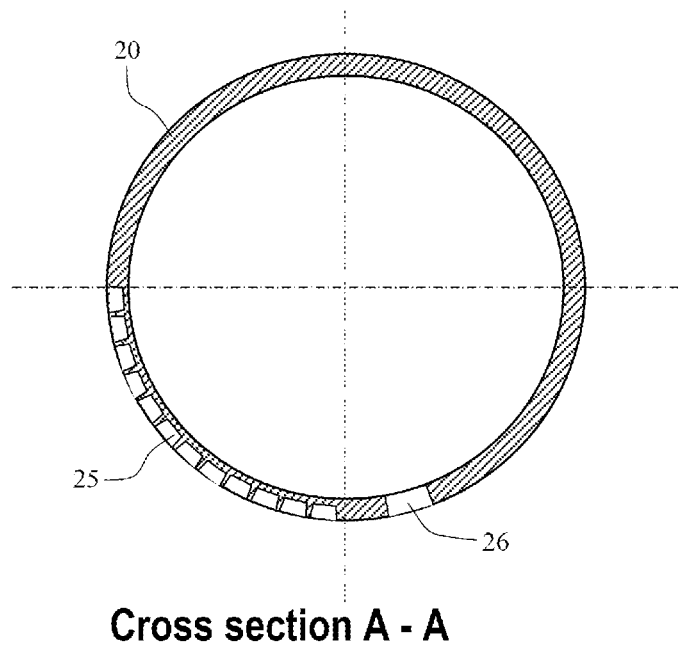
FIG. 4 represents a cross-sectional view of the rotating ring.

FIG. 4 represents a cross-sectional view of the rotating ring 20. It comprises the notches 25 and the slit 26. The form of the notches makes it possible to adjust the force needed to switch from one notch to the other. The deeper the notches, the greater the force needed to jump a notch. The interval between two notches determines the sensitivity of the device for adjusting the braking force. The number of notches determines the number of possible positions of the ring and its rotational travel.

Figure 5:
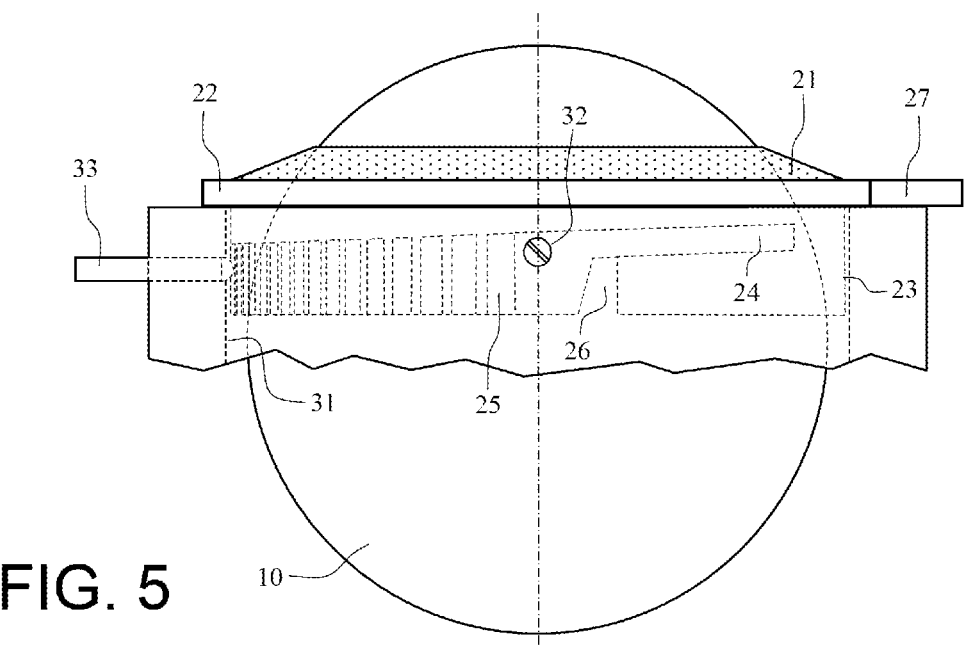
FIG. 5 represents a front view of the preceding adjustment device, once assembled.

FIG. 5 represents the rotating ring 20 mounted in its support 30. The ring 20 is mounted in the void 31 of the fixed support and rests on its shoulder 22. The fixed pin 32 is housed in the oblong 24 of the ring and the indexing finger 33 in one of the notches 25 of the ring.

The rotation of the ring is ensured by the maneuvering lever 27. It causes the displacement of the pin 32 in the oblong 24, the indexed notch to change and a translational motion of the ring parallel to the axis of revolution of the cylinder. The flexible seal 21 which rests on the rolling ball 10 then exerts a lesser or greater pressure depending on the elevation of the ring 20.

The hollow cylinder of the ring can comprise at least one second oblong identical to the first oblong and a second plurality of notches identical to the first plurality of notches. This second set of oblong and notches is arranged symmetrically in relation to the first set of oblong and notches. The effects of butting of the ring in its support are thus avoided.

Production of the various mechanical parts of the device does not pose any particular problems in as much as they do not require high production precision.

The invention claimed is:

1. A device for adjusting the braking force of a rolling ball or "trackball", comprising: a rotating ring in the form of a cylinder that is straight, circular, and hollow, said ring comprising a flexible annular braking seal, an outer periphery of the cylinder comprising: a first oblong inclined by an angle of a few degrees in relation to a base of the cylinder; a first plurality of identical notches at right angles to said base of the cylinder, an inner diameter of the cylinder is greater than an outer diameter of the rolling ball and an inner diameter of the annular seal is less than the outer diameter of the rolling ball; and a fixed support comprising: a circular void with a diameter equal to a diameter of the outer periphery of the cylinder; a fixed pin and an indexing finger arranged so that, the ring being mounted in the void of the fixed support, the fixed pin is housed in the first oblong of the ring and the indexing finger in one of the first plurality of identical notches of the ring, wherein a rotation of the ring is configured to cause displacement of the pin in the first oblong, the arrangement of the indexing finger to be changed such that the indexing finger is housed in a different one of the first plurality of identical notches, and a translational motion of the ring parallel to an axis of revolution of the cylinder.

2. The adjustment device according to claim 1, wherein the cylinder of the ring comprises at least one second oblong identical to the first oblong and a second plurality of notches identical to the first plurality of identical notches.

3. The adjustment device according to claim 1, wherein the outer periphery of the cylinder comprises a manoeuvring lever for manoeuvring the ring.

4. The adjustment device according to claim 3, wherein the fixed support comprises markings making it possible to identify the position of the manoeuvring lever.

5. The adjustment device according to claim 1, wherein the outer periphery of the cylinder comprises, at an entry of the first oblong, a slit making it possible to fit the rotating ring in the fixed support.

6. The adjustment device according to claim 5, wherein the fixed support comprises a block for blocking the slit so as to avoid any removal of the rotating ring mounted in its support.

7. A rolling ball or trackball device comprising at least one ball, wherein said rolling ball device comprises the device for adjusting the braking force of said ball according to claim 1.

* * * * *